I. M. NOBLE AND W. E. GOSSLING.
STORAGE BATTERY.
APPLICATION FILED AUG. 26, 1918.
1,350,561. Patented Aug. 24, 1920.
2 SHEETS—SHEET 1.
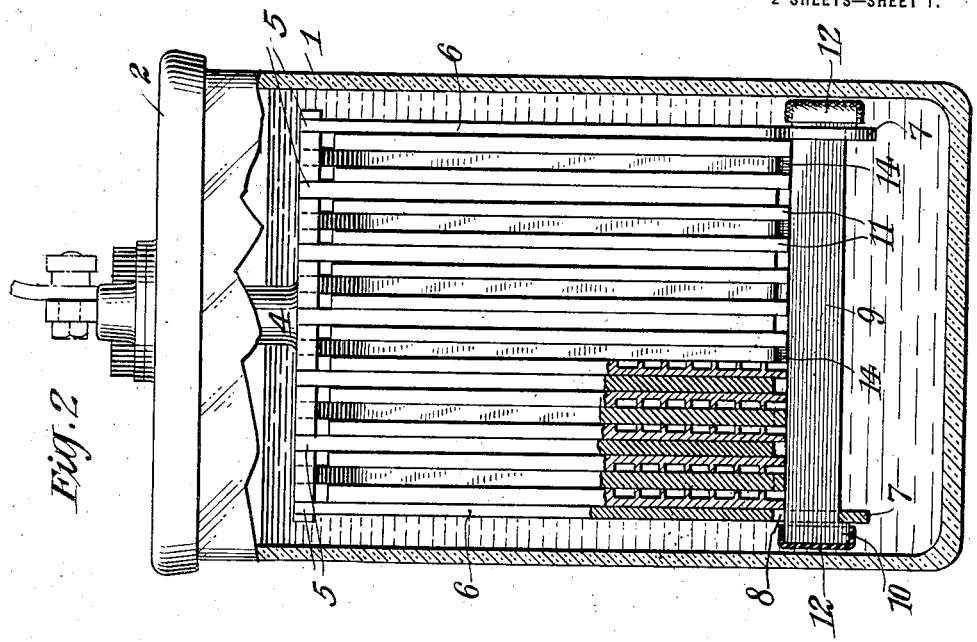
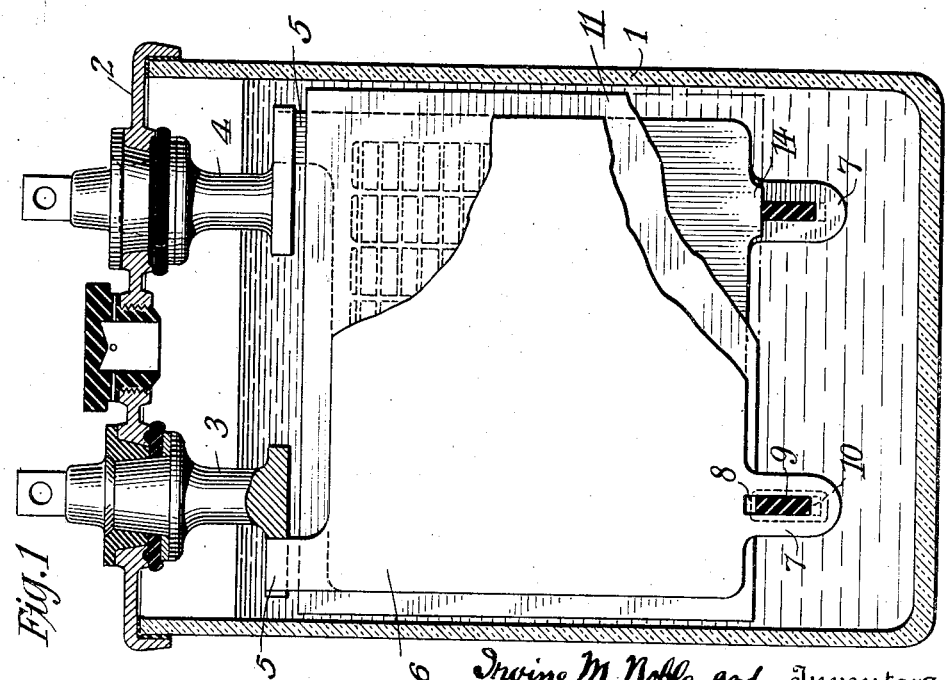
Irvine M. Noble and Walter E. Gossling, Inventors
By their Attorneys,
Kerr Page Cooper & Hayward.

I. M. NOBLE AND W. E. GOSSLING.
STORAGE BATTERY.
APPLICATION FILED AUG. 26, 1918.
1,350,561.
Patented Aug. 24, 1920.
2 SHEETS—SHEET 2.
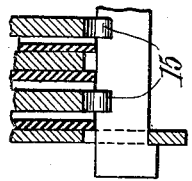 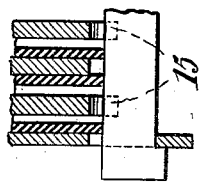 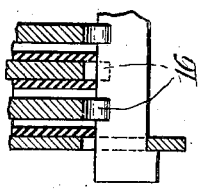 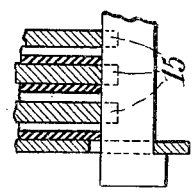
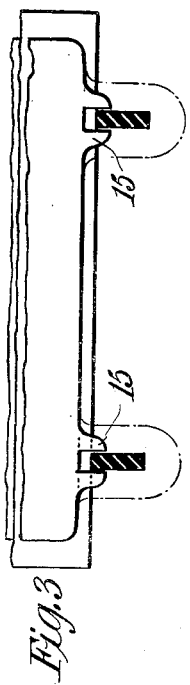 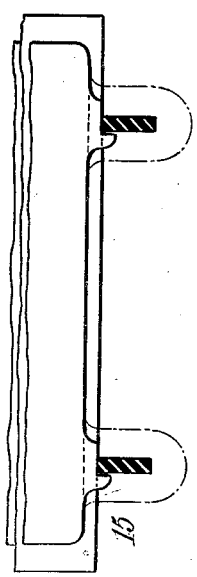 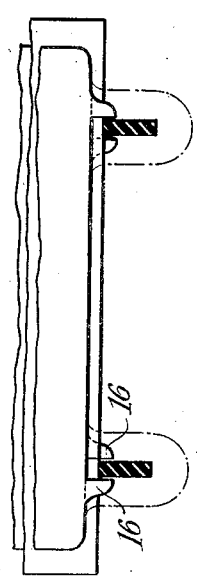 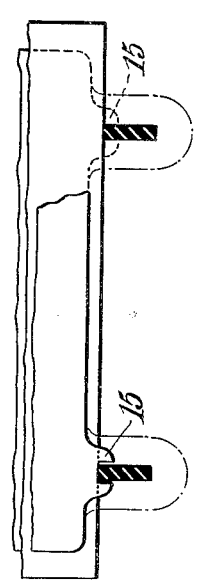
Irvine M. Noble and
Walter E. Gossling,
By their Attorneys,
Kerr Page Cooper & Hayward.

UNITED STATES PATENT OFFICE.

IRVINE M. NOBLE AND WALTER E. GOSSLING, OF INDIANAPOLIS, INDIANA, ASSIGNORS TO THE PREST-O-LITE COMPANY, INC., A CORPORATION OF NEW YORK.

STORAGE BATTERY.

1,350,561.     Specification of Letters Patent.     Patented Aug. 24, 1920.

Application filed August 26, 1918. Serial No. 251,359.

*To all whom it may concern:*

Be it known that we, IRVINE M. NOBLE and WALTER E. GOSSLING, both citizens of the United States, residing at Indianapolis, in the county of Marion and State of Indiana, have invented certain new and useful Improvements in Storage Batteries, of which the following is a full, clear, and exact description.

This invention is an improvement in storage batteries applicable generally to such devices, but more especially designed for use with batteries intended for isolated plants such as house lighting. The chief objects of the improvement are to produce a more compact battery in which the plates are not subject to any displacement, such as fanning or spreading, and this we accomplish by the construction that may be described in general terms as follows.

The outside, which are usually the negative plates of battery element, are constructed or provided at their lower edges and near their sides with projections or extensions containing vertical slots. Through these slots are passed flat hard rubber strips, which span the two outside plates and which are adapted to constitute bridge supports for the separators. Preferably the ends of the bridge strips are made wider than the intermediate portions or with lugs thereon so that when inserted and allowed to drop to the lower ends of the slots, the enlarged ends form shoulders which engage with the projections on the plates and serve to maintain the entire element in position and prevent spreading.

The positive plates may rest on the bridges or engage therewith in various ways as hereinafter indicated, and the ends of the bridge strips may have soft rubber caps thereon to lessen any possible breakage of the glass battery jars from contact or shock at such points during handling or shipment.

The details and specific nature of the improvement will be more fully set forth by reference to the accompanying drawings in which:

Figure 1 is a vertical central section of a battery embodying the invention.

Fig. 2 is a cross section of the same at right angles to Fig. 1.

Figs. 3, 4, 5 and 6 are details of modifications shown mainly in elevation; and

Figs. 7, 8, 9 and 10 are corresponding sectional details of the same.

The jar for containing the battery element is designated by the numeral 1, the cover by 2, and the positive and negative terminal posts and plate straps by 3 and 4. The plates have lugs 5 at their upper corners by which, in the usual and well known manner they are connected with and supported by the posts 3 and 4, as shown.

The outside negative plates 6 at opposite sides of their lower edges are constructed or provided with extensions or projections 7 which contain vertical slots 8.

When the plates are properly assembled and supported, bridge pieces or strips 9, preferably of hard rubber or other suitable insulating material, are passed through the slots in the opposite outside plates, and these strips, as shown in Fig. 2, are made wider at their ends, sufficiently for the purpose of the case at the lower edge only, so as to afford a lug or shoulder 10, so that when passed through the slots the strips will drop to bring the said shoulders into engagement with the outer surfaces of the plates, and thus effectively prevent the entire element from expanding or fanning out.

These bridge strips afford supports for the separators of wood or other insulating material 11, which are used between the plates. They may also serve to engage either or both the intermediate positive and negative plates which are thus prevented from slipping apart as a result of their off-center support. Finally, soft rubber caps 12 are placed over the projecting ends of the strips to take up any possible shocks by the element coming in contact with the walls of the jar.

In carrying out this invention various modified expedients may be adopted as desired, or as found necessary. For example, as shown in Fig. 2, the positive plates may be provided with feet 14, which rest upon the top edge of the bridges. In this case the negative plates do not rest upon the bridges, the group of plates being merely held in position by the frictional contact of the positive plates against the bridges fastened to the outside negative plates only.

The negative plates in this arrangement may, however, be provided with one or more feet each, or both negative and positive plates may each have one foot.

In Fig. 3 the negative plates remaining as before, the positive plates are provided with notched feet, the extensions 15 of the notches extending downward over the bridges so as to lock the positive group in definite position. In Fig. 4, the positive plates are shown as provided with feet having but one projection or stop 15, which extends downward and engages but one side of the bridge strip.

In Fig. 5 the positive and negative plates have no feet but each has a pair or pairs of downwardly-extending projections or lugs 16, and in this arrangement it is not intended that the plates should rest upon the bridges so much as that the projections or lugs should come in contact with the sides of the bridge strip near its top. Being opposed in their action to each other, they thus tend to pinch the bridge and thus remove all outside strain thereon as the groups of plates tend to aline themselves in their centers of gravity.

In Fig. 6 both the positive and the inside negative plates have feet with notches and have projections 15 extending downwardly on each side of the top edge of the bridge.

From the above it is obvious that the disposition of lugs or feet with projections may be otherwise modified, and that one or more may be used for each plate acting on one or on both sides of each bridge strip. It is further manifest that the function and not the form of the bridge strips and plates, including the projections for supporting the bridges, is the essence of the invention.

What we claim is:

1. The combination in a storage battery with the group of elements, the outside negative plates of which are provided with slotted projections or extensions from their lower edges, of insulating bridge strips supported by the slots in said projections and extending beyond the surface of the same substantially to the walls of the battery cell, and forming supports for the intermediate positive plates and separators, the bridge strips being formed with shoulders which engage with the outer surfaces of the projections to prevent spreading of the elements, and soft rubber caps applied over the ends of the bridge strips to form cushions between the same and the walls of the cell.

2. In a storage battery the combination with the group of elements, the outside plates having projections from their lower edges, of insulated bridge strips passing through slots in the said projections, having shoulders for engaging with the outer surfaces thereof and extending beyond the projections to the walls of the cell, the said strips forming supports for intermediate plates which have projections in their lower edges to embrace and engage with said strips, whereby fanning and spreading of the plates are prevented and their position in the cell maintained.

In testimony whereof we hereunto affix our signatures.

IRVINE M. NOBLE.
WALTER E. GOSSLING.